United States Patent [19]

Bengtsson et al.

[11] Patent Number: 4,467,919
[45] Date of Patent: Aug. 28, 1984

[54] APPARATUS FOR THE SAFE-KEEPING OF SHEETS OF FILM

[76] Inventors: Tor L. J. Bengtsson; Björn E. Ericsson, both of Box 7096, Halmstad, Sweden

[21] Appl. No.: 375,137

[22] PCT Filed: Sep. 3, 1981

[86] PCT No.: PCT/SE81/00247
§ 371 Date: Apr. 7, 1982
§ 102(e) Date: Apr. 7, 1982

[87] PCT Pub. No.: WO82/00900
PCT Pub. Date: Mar. 18, 1982

[30] Foreign Application Priority Data

Sep. 4, 1980 [SE] Sweden .............................. 8006164

[51] Int. Cl.³ .................. B65D 81/30; H05G 1/28; G03B 41/16
[52] U.S. Cl. ..................... 206/455; 220/23; 378/167
[58] Field of Search ............. 206/455, 524.8; 220/323; 250/468, 475, 480

[56] References Cited

U.S. PATENT DOCUMENTS 2,905,356  9/1959  Jerome ............................. 220/323
3,511,990  5/1970  Hauss ............................... 205/455
3,971,470  7/1976  White ............................... 206/455
4,194,625  3/1980  Stievenart et al. ............. 206/524.8

Primary Examiner—William T. Dixson, Jr.
Attorney, Agent, or Firm—Beveridge, DeGrandi & Kline

[57] ABSTRACT

The disclosure relates to an apparatus for the safe-keeping of a sheet of film before, during and after its exposure in, for example, an X-ray camera, the apparatus being in the form of a box of great length and width and low height, the box having an openable and closable lid.

The inventive concept forming the basis of the present invention is that of realizing an improvement to aid in, and more effective equipment for, the safekeeping of film sheets.

Such a concept is achieved according to the present invention in that the apparatus disclosed by way of introduction is characterized in that the bottom and at least one side wall, which preferaby is a longitudinal side wall, are disposed in an integral unit, the longitudinal side wall consisting of a strip bent at a right angle to the bottom.

1 Claim, 4 Drawing Figures

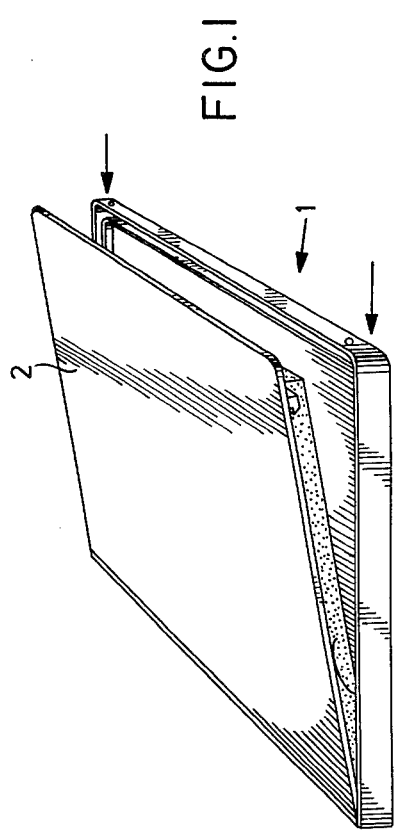
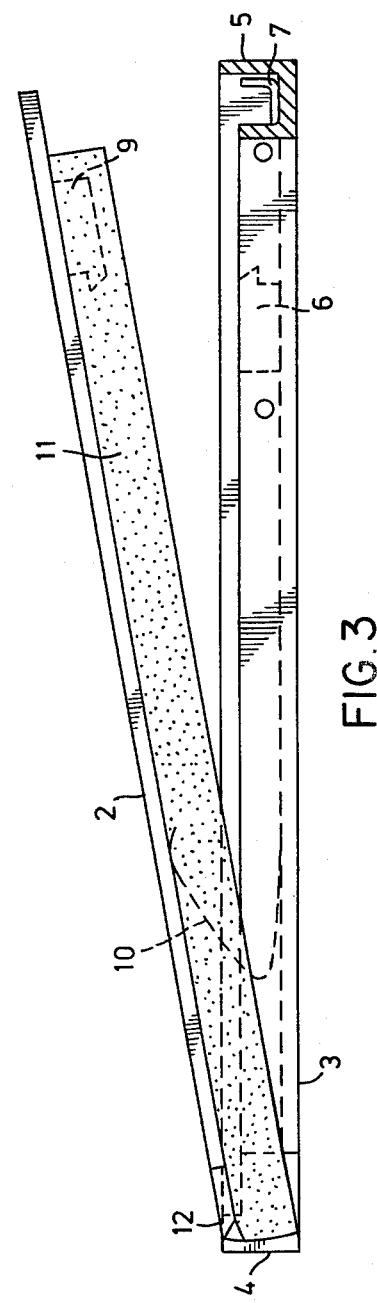

APPARATUS FOR THE SAFE-KEEPING OF SHEETS OF FILM

TECHNICAL FIELD

The present invention relates to an apparatus for the safekeeping of film sheets before, during and after exposure thereof in, for example, an X-ray camera, the apparatus being in the form of a box of great length and width and low height, and the box having an openable and closable lid.

THE STATE OF THE ART/TECHNICAL PROBLEM

One of the methods for investigating the presence of cancer of the breast in women is mammography, i.e. breast X-rays. Because of the high frequency of cancer of the breast in women, primarily in the age group between 35 and 69 years, it is desirable to be able to examine women in this risk zone at least every other year, which would entail 850,000 examinations per year in Sweden alone. Each examination comprises from 2 to 3 images taken per breast and present installations have a capacity of from 4 to 5 such examinations per hour. Furthermore, it is desirable that one edge of the image be located as close to the ribcage as possible, whereby the probability of photographing the entire breast is greatly improved.

Thus, there is a need both of improved aids and more effective equipment in this art.

These needs are now satisfied according to the present invention in that the apparatus disclosed by way of introduction is characterized in that the bottom and at least one side wall, which is preferably a longitudinal side wall, are disposed integrally with one another, the longitudinal side wall consisting of a strip bent at a right angle to the bottom. Preferably, the lid is fixedly secured to the above-mentioned longitudinal side wall by the intermediary of a film hinge and, on the inside, displays a compression pad for urging of the film sheet against the bottom. At the edge opposed to the hinge, the lid is provided with locking means for cooperation with locking means in the box.

ADVANTAGES

An apparatus or cassette according to the present invention is extremely simple to handle, primarily from the loading and unloading points of view. Furthermore, the apparatus or cassette according to the present invention allows for extremely close abutment against the ribcage and almost totally lacks image-restricting parts.

DESCRIPTION OF THE ACCOMPANYING DRAWINGS

FIG. 1 is a schematic perspective view of one embodiment of an apparatus according to the present invention.

FIG. 3 is a section taken along the line A—A in FIG. 2.

As will be apparent to the skilled reader of FIG. 1, an apparatus according to the present invention is in the form of a box 1 with an openable and closable lid 2. The box 1 is of great width and length while being of low height.

Figure 2:
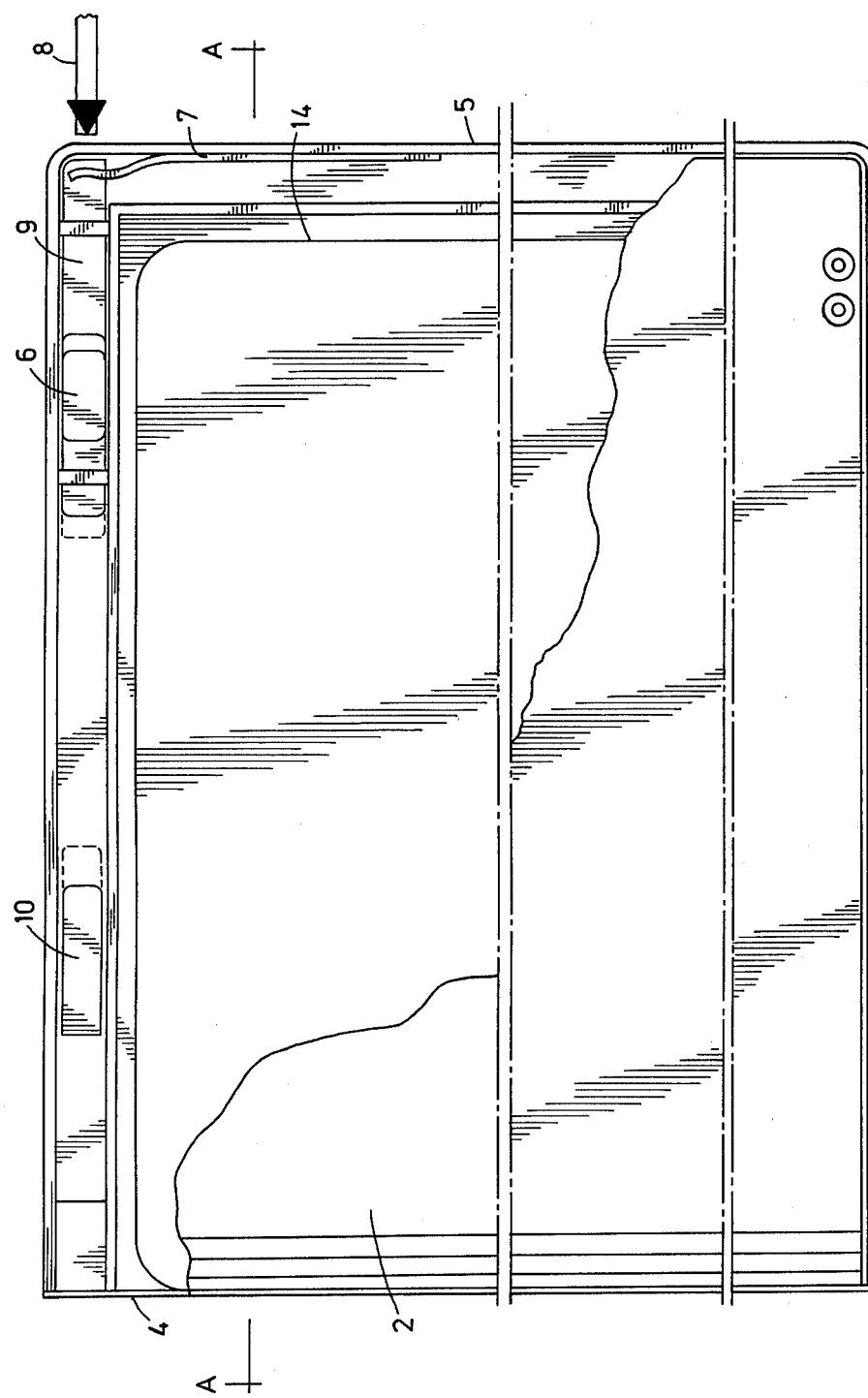
FIG. 2 shows, on a larger scale, a top plan view of the apparatus of FIG. 1, certain parts having been broken away.
Figure 4:
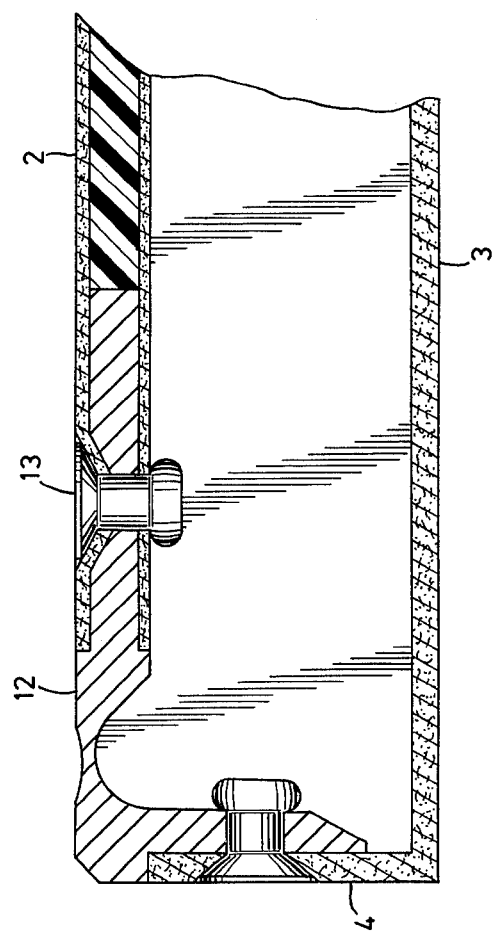
FIG. 4 shows, on a larger scale, a part section of the appparatus of FIG. 3.

FIGS. 2 to 4 show the box 1 in greater detail. The bottom 3 and one longitudinal side wall 4 of the box consist preferably of a rigid carbon fibre material, a material which has proved to have excellent properties in conjunction with X-ray photography. The remaining side walls of the box 1 consist of an aluminium frame with a locking lug 6 at the end of the short side walls opposed in relationship to the longitudinal side wall 4, only one locking lug 6 being illustrated in the FIG. 2, whereas the other is merely intimated. The locking lugs are urged towards the closing position by means of locking springs 7 and, in the aluminium frame, there are provided, in register with the locking lugs 6, recesses for the passage of a pin 8 for removal of the locking lugs from their closing position in engagement with a corresponding, fixed locking lug 9 on the lid 2. Furthermore, in the aluminium frame 5 there is provided an opening spring 10. Although but one single spring 10 is illustrated on the Drawing, there may, naturally, be provided one opening spring 10 in each short side wall.

The lid 2 consists of a so-called sandwich construction preferably of aluminium and polyethylene. On the inner side of the lid 2, there is fixedly disposed a compression pad 11 which serves to compress a film sheet 14 against the bottom 3 and against the inside of the longitudinal side wall 4. As will be apparent to the skilled reader of FIG. 4, the lid 2 is mounted on the longitudinal side wall 4 by the intermediary of a film hinge 12 of per se conventional type. The lid 2 proper may be fixedly disposed on one of the hinge portions by means of rivets 13.

For loading the cassette 1, 2 with a sheet of film 14, the sheet may be inserted into a loading apparatus through an opening with light-tight edges. After passage through the opening, pins 8 on a holder will extend into holes in register with the locking lugs 6 and move the locking lugs 6 out of engagement with the locking lugs 9, whereby the lid 2 will be opened and moved into the loading position by means of the spring or springs 10. The holes in register with the locking lugs 6 are located more proximally the lower edge than the upper edge, whereby the cassette cannot be opened if it is inserted into the apparatus turned in incorrect direction. Naturally, this is of particular importance on opening of the cassette after exposure of the film sheet. When gripping devices in the apparatus release a sheet of film, the sheet will fall down onto a table and slide into the cassette 1, 2.

On closure of the lid 2 on the film cassette, the compression pad 11 will move the sheet of film 14 into abutment with the longitudinal side wall 4, whereby the position of the sheet of film 14 against the longitudinal side wall 4 will be ensured.

We claim:

1. An apparatus for the safekeeping of a sheet of film (14) before, during and after exposure thereof in, for example, an X-ray camera, said apparatus being in the form of a box (1) of great length and width and low height, said box (1) having an openable and closable lid (2), wherein the bottom (3) and at least one side wall (4), which preferably is a longitudinal side wall, are disposed in a unit with one another, the longitudinal side wall (4) consisting of a strip bent at a right angle to the bottom;

said lid (2) is fixedly disposed on said longitudinal side wall (4) by the intermediary of a film hinge device and, on the inner side, displays a compression pad (11) for compression of the film sheet (14) against the bottom (3) and said longitudinal side wall (4);

wherein the lid, at the oppposed edge in relation to the hinge means, has locking means for cooperation with locking means in the box.

* * * * *